United States Patent
Achour et al.

(10) Patent No.: US 6,363,260 B1
(45) Date of Patent: Mar. 26, 2002

(54) SYSTEM AND METHOD FOR EDGE OF COVERAGE DETECTION IN A WIRELESS COMMUNICATION DEVICE

(75) Inventors: Baaziz Achour; Robbin Hughes; Farrukh Usmani; Syed N. Ahsan, all of San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/348,442

(22) Filed: Jul. 7, 1999

(51) Int. Cl.[7] .............................. H04B 1/38; H04M 1/00
(52) U.S. Cl. ..................... 455/553; 455/552; 455/432; 455/513
(58) Field of Search .................... 455/552, 553, 455/513, 437, 450–454, 422, 434, 436, 432, 512, 67.1, 296, 426, 515

(56) References Cited

U.S. PATENT DOCUMENTS

| | | | |
|---|---|---|---|
| 5,020,093 A | | 5/1991 | Pireh .......................... 455/552 |
| 5,260,988 A | | 11/1993 | Schellinger et al. ......... 455/552 |
| 5,722,072 A | * | 2/1998 | Crichton et al. ............. 455/437 |
| 5,754,542 A | * | 5/1998 | Ault et al. ................... 455/553 |
| 5,842,122 A | * | 11/1998 | Schellinger et al. ........ 455/403 |
| 5,930,710 A | * | 7/1999 | Sawyer et al. .............. 455/437 |
| 5,950,127 A | * | 9/1999 | Nitta et al. .................. 455/426 |
| 6,047,180 A | * | 4/2000 | Coutant ....................... 455/434 |
| 6,081,714 A | * | 6/2000 | Wakizaka .................... 455/436 |
| 6,119,003 A | * | 9/2000 | Kukkohovi .................. 455/434 |

FOREIGN PATENT DOCUMENTS

| | | | |
|---|---|---|---|
| EP | 0762669 | 12/1996 | ............ H04Q/7/38 |
| GB | 2285555 | 12/1993 | ............ H04Q/7/32 |
| GB | 2307831 | 11/1996 | ............ H04Q/7/38 |
| WO | 9628947 | 3/1996 | ............ H04Q/7/38 |
| WO | 9733448 | 2/1997 | ............ H04Q/7/38 |
| WO | 9810617 | 9/1997 | ............ H04Q/7/38 |

OTHER PUBLICATIONS

Newton's Telecom Dictionary, 15th ed., 1999, pp 147 and 740.*

* cited by examiner

*Primary Examiner*—Doris H. To
*Assistant Examiner*—Eliseo Ramos-Feliciano
(74) *Attorney, Agent, or Firm*—Philip R. Wadsworth; Charles D. Brown; George C. Pappas (57) ABSTRACT

A method to enhance performance of a dual-mode or dual-band mobile phone includes, after the phone has initially connected to a CDMA wireless network, monitoring a level of total power received by the phone. This power level is compared to a preset threshold level. If the power level remains below the threshold level for over two seconds, the dual-mode or dual-band phone switches to an AMPS or other network retrieved from the preferred roaming list that is stored in the phone. If the power level is above the threshold, the phone moves into the idle state. Once in the idle state, both the pilot strength and Received Signal Strength Indication are monitored. If both of these levels are below respective thresholds for over eight seconds, the phone switches to another network stored in the preferred roaming list. If the mobile phone is not a dual-mode or dual-band phone, the mobile phone can perform similar measurements and switch between service provider systems compatible with the mobile phone.

16 Claims, 5 Drawing Sheets

SYSTEM AND METHOD FOR EDGE OF COVERAGE DETECTION IN A WIRELESS COMMUNICATION DEVICE

FIELD OF THE INVENTION

The present invention is related generally to a wireless communication device and, more particularly, to a system and method to detect the edge of service in a first communication system and obtain coverage in a second communication system for the wireless communication device.

BACKGROUND OF THE INVENTION

Wireless communication devices, such as cellular telephones, are widely used as a replacement for and in addition to conventional telephone systems. In addition to providing the functionality of a conventional telephone, wireless communication devices offer the advantage of portability, thus enabling the user to establish a wireless communication link between virtually any two locations on Earth.

Wireless communication devices operate within regions or cells of coverage each having a geographic coverage area. A transmitter and receiver, centrally located within each cell, is controlled such that the effective coverage area of the cell just overlaps with adjacent cells. Cells for analog wireless communication devices and cells for digital wireless communication devices may not be coextensive. That is, although a given city may have complete analog cellular coverage and complete digital cellular coverage, analog and digital cell boundaries are usually different.

Typically, wireless communication devices have lower levels of performance when they are near the edge of a cell than when they are not near an edge. Therefore, when traveling from one cell to another, performance of a wireless communication device tends to degrade while approaching the edge of a first cell and does not return to full performance until the wireless communication device is away from the edge of the second cell. This is an especially important effect when the cell is on the edge of the coverage area, here there is no second cell to move into. This degradation is especially frustrating when the edge of one system's coverage area is the beginning of another system's coverage area. Thus, it is apparent that there is a need to increase the performance of wireless communication devices when located near the edge of a cell, and especially at the edge of a coverage area. The present invention provides this and other advantages as will be apparent from the following figures and accompanying description.

SUMMARY OF THE INVENTION

In one aspect of the present invention, a system and method to enhance performance of a mobile phone is presented. The method includes monitoring a level of performance of the mobile telephone communicating with a first service provider system, comparing the first performance level with a first threshold level and, if the first performance level remains below the first threshold level for a first duration of time, switching the telephone to a second service provider system.

In another aspect of the invention, when the mobile phone is in an idle mode, first and second performance levels are monitored. If the first performance level falls below a first threshold or the second performance level falls below a second threshold a timer is started. If both the first and second performance levels exceed their respective thresholds, the timer is reset, but if the timer runs long enough to exceed a preset time limit, the mobile telephone switches to another service provider system. If the mobile phone is a dual-mode or dual-band phone, it is possible to switch between modes or bands when switching service provider systems.

DETAILED DESCRIPTION OF THE PREFERRED EMBODIMENTS

The present invention is directed to a technique for increasing the performance of a wireless communication device near the edge of coverage when another wireless system is available. Most populated areas of the United States and of the world are covered by at least one type of wireless communication service. One type of such service is Advanced Mobile Phone Service (AMPS). AMPS is an analog cellular phone system and is well known in the art. Additionally, some areas may have Personal Communication Service (PCS), or a digital cellular telephone system or both. One form of digital cellular telephone system is Code Division Multiple Access (CDMA), also well known in the art.

Several factors contribute to the performance of a wireless communication device, such as distance from the cellular base station transceiver subsystem (BTS), BTS transmitter power, geographical considerations, and proximity to buildings or other reflective surfaces among other factors. When the wireless communication device is traveling between cells, performance gradually degrades as the wireless communication device approaches the edge of the current cell and gradually increases once the wireless communication device establishes communication with the BTS of an adjacent cell and moves away from the boundary between the cells and closer to the BTS in the newly acquired cell. The process of switching communication from one cell to another is called a handoff. Many types of handoffs, such as hard and soft handoffs, are known in the art and need not be described in detail herein.

Depending on the location of the cell boundaries, it may be the case that the wireless communication device is handing off between two CDMA cells (and thus experiencing poor quality while near the boundaries of the CDMA cells) while also located in the middle of an AMPS cell where the wireless communication device would be experiencing excellent service if the device were currently using AMPS.

Occasionally, CDMA systems may have a link imbalance where a forward link, (i.e., the data link sent from the BTS to a wireless communication device such as a mobile or cell phone), is much stronger than the reverse link (i.e., the data from the wireless communication device back to the BTS).

On these occasions, it is possible for the wireless communication device to receive paging messages from the BTS indicating CDMA coverage is available, even though the mobile phone is unable to communicate with the BTS over the reverse link at a sufficient level to make or receive a call. This can be frustrating for the operator of the mobile phone. It is also particularly frustrating to carriers that operate both CDMA and AMPS systems because the mobile phone may be in a location where it could receive good AMPS coverage. While a carrier that only operates CDMA systems may desire that the mobile phone stay with a CDMA system at all times, a carrier that operates both AMPS and CDMA systems prefers the mobile phone to connect to the better service when performance with the current system degrades. For instance, the mobile phone may switch from CDMA to AMPS when performance is deficient in the CDMA system but would be adequate in the AMPS system. The present invention allows the wireless communication device to determine it is in a weak coverage area and try other systems in order to establish better service.

Figure 1:
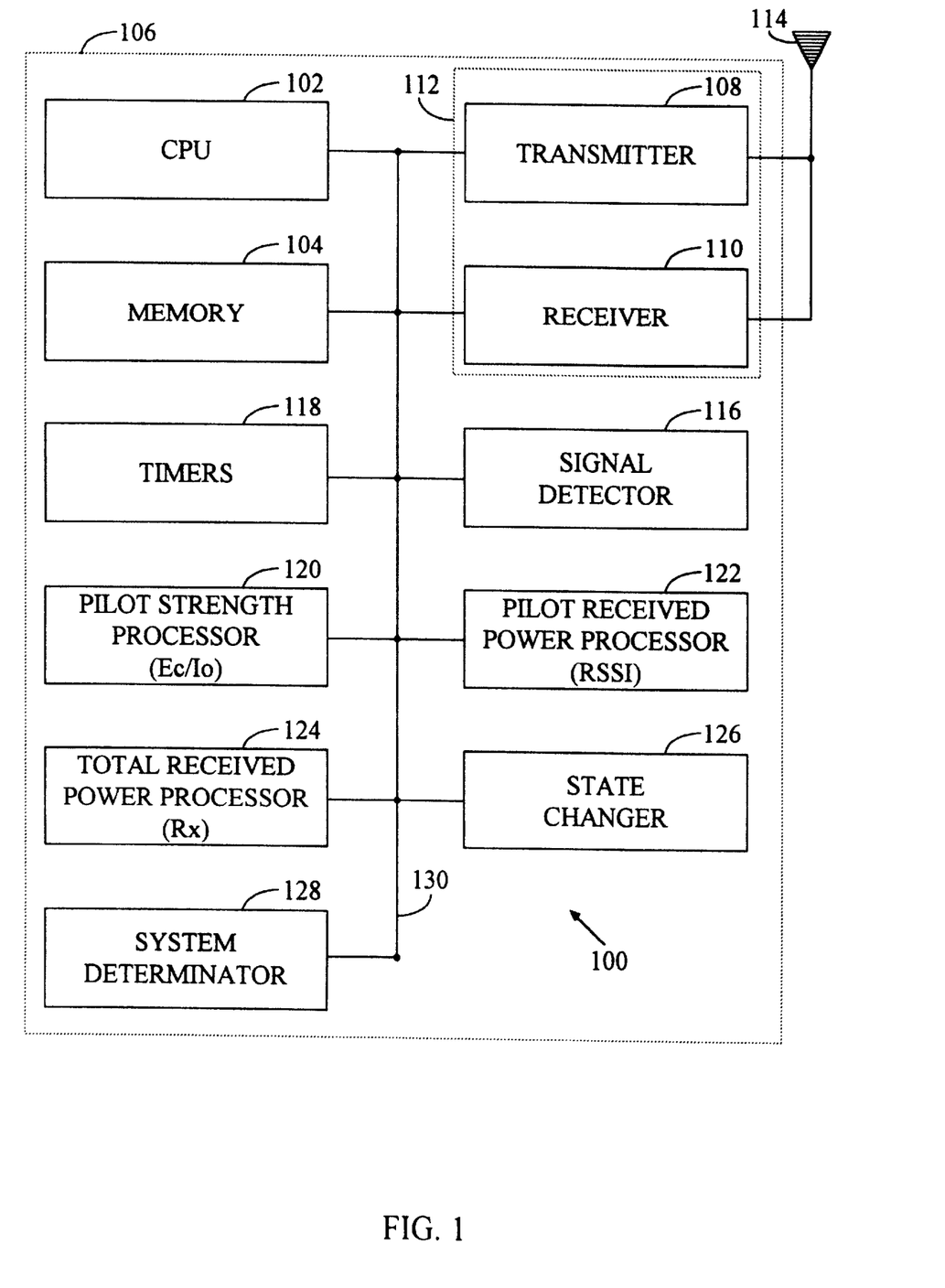
FIG. 1 is a functional block diagram of an exemplary embodiment of the wireless communication device of the present invention.

The present invention is embodied in a system 100 illustrated in the functional block diagram of FIG. 1. The system 100 includes a central processing unit (CPU) 102 which controls operation of the system. A memory 104, which may include both read-only memory (ROM) and random access memory (RAM), provides instructions and data to the CPU 102. A portion of the memory 104 may also include non-volatile random access memory (NVRAM).

Figure 2:
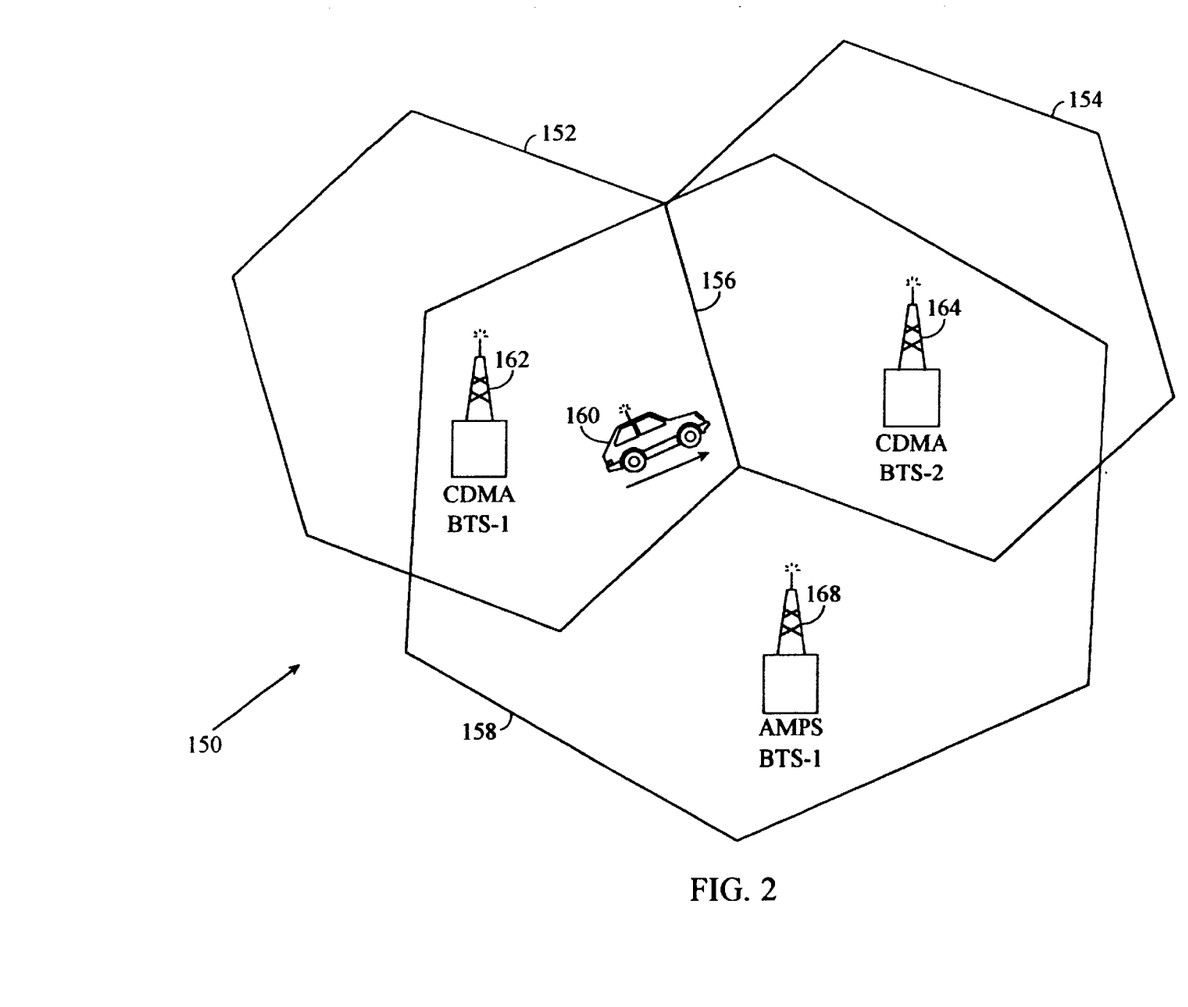
FIG. 2 illustrates a representative coverage diagram for wireless communication systems.

The system 100, which is typically embodied in a wireless communication device such as a cellular telephone, also includes a housing 106 that contains a transmitter 108 and a receiver 110 to allow transmission and reception of data, such as audio communications, between the system 100 and a remote location, such as a cell site controller or BTS (see FIG. 2). The transmitter 108 and receiver 110 may be combined into a transceiver 112. An antenna 114 is attached to the housing 106 and electrically coupled to the transceiver 112. The operation of the transmitter 108, receiver 110, and antenna 114 is well known in the art and need not be described herein.

The system 100 also includes a signal detector 116 used to detect and quantify the level of signals received by the transceiver 112. The signal detector 116 detects such signals as total energy, pilot energy per pseudonoise (PN) chips, power spectral density, and other signals, as is known in the art. Various indicators and values are calculated by the signal detector 116 for use in the system 100, as described in further detail below.

A set of timers 118 works in conjunction with a pilot strength processor 120, a pilot received power processor 122, and a total received power processor 124. By measuring the levels of the signals received and processing these signals, the system 100 can determine the quality of the communication channel between the wireless communication device and its BTS.

The pilot strength processor 120 receives a pilot strength indicator (Ec/Io) from the signal detector 116. The signal detector 116 divides the ratio of pilot energy per PN chip (Ec) by the total power spectral density received at the transceiver 112 (Io). This ratio of pilot energy to overall received energy is called "pilot strength," as is known in the art. Also as known in the art, the pilot strength depends on loading conditions of an active cell and adjacent cells, and thus is an indication of traffic load in a particular cell.

The total received power processor 124 uses a variable Rx that is detected and quantified at the signal detector 116. The total received power (Rx) is a measure of all power received at the transceiver 112. It includes thermal noise, interference from other callers and a pilot signal transmitted to that particular transceiver 112. A total of all this energy received is stored in the variable Rx indicating total received power.

The pilot received power processor 122 receives a Received Signal Strength Indicator (RSSI) from the signal detector 116. The RSSI indicates the pilot received power and, in an exemplary embodiment, is calculated by adding the total received power (Rx) with the (Ec/Io), as is known in the art. The RSSI is independent of system loading and variation in the RSSI indicates forward link path loss changes. These path loss changes are important in determining when to switch service, described in detail below.

A state changer 126 of the system 100 controls the state of the wireless communication device based on a current state and additional signals received by the transceiver 112 and detected by the signal detector 116. The wireless communication device is capable of operating in any one of a number of states, as later described with reference to FIG. 3.

The system 100 also includes a system determinator 128 used to control the wireless communication device and determine which service provider system the wireless communication device should transfer to when it determines the current service provider system is inadequate.

The various components of the system 100 are coupled together by a bus system 130 which may include a power bus, a control signal bus, and a status signal bus in addition to a data bus. However, for the sake of clarity, the various busses are illustrated in FIG. 1 as the bus system 130. One skilled in the art will appreciate that the system 100 illustrated in FIG. 1 is a functional block diagram rather than a listing of specific components. For example, although the pilot strength processor 120, pilot received power processor 122, and the total received power processor 124 are illustrated as three separate blocks within the system 100, they may in fact be embodied in one physical component, such as a digital signal processor (DSP). They may also reside as program codes in the memory 104 and operated on by the CPU 102. The same considerations apply to the other components listed in system 100 of FIG. 1.

Operation of components shown in the system 100 of FIG. 1 will be explained with reference to FIGS. 2–5. FIG. 2 shows a coverage diagram 150 including multiple boundaries of wireless communication cells. FIG. 2 is not drawn to scale, but is merely intended to illustrate areas of coverage and boundaries between those areas of coverage. The diagram 150 includes a first CDMA cell 152 that shares a common boundary 156 with an adjacent CDMA cell 154. Although the boundary 156 is illustrated as a straight line between the CDMA cell 152 and the CDMA cell 154, it is well understood that the areas of coverage in the CDMA cells overlap and that the boundary 156 depends on many factors, such as geographic terrain, buildings, and the like. For the sake of clarity in understanding the present invention, the boundary 156 in FIG. 2 is shown as a straight line.

The CDMA cell 152 contains a BTS 162 labeled CDMA BTS-1. The BTS 162 is located in approximately the center of the CDMA cell 152. The CDMA cell 154 likewise contains a BTS 164 located roughly in the center of that CDMA cell 154 and labeled CDMA BTS-2. As stated above, some of the factors that determine the distance of the borders of the cells 152, 154 from their respective BTS' include antenna shape and orientation, terrain, presence or absence of reflective surfaces, and environmental factors such as weather.

An AMPS cell 158 is shown having noncontiguous borders with the CDMA cells 152 and 154. The size of the cells 152, 154, and 158 does not indicate actual relative size, or orientation, but is shown only for illustration. As is known in the art, CDMA cells are typically smaller than AMPS cells, but this is not relevant for purposes of explanation of the invention as the invention will operate in cells of any size and orientation.

The AMPS cell 158 includes a BTS 168 in its approximate center, labeled AMPS BTS-1. The AMPS BTS 168 differs from the CDMA BTSs 162 and 164 principally in the frequencies transmitted and received as well as the modulation format. The AMPS BTS 168 transmits and receives an analog signal on a first set of frequencies while the CDMA BTSs 162 and 164 transmit and receive digital signals on a separate set of frequencies. These and other differences between the AMPS system and a digital system, such as CDMA, are well known in the art and need not be described herein.

In FIG. 2, a wireless communication device such as a mobile or mobile phone 160 is depicted as being transported by an automobile in CDMA cell 152. The mobile phone 160 is approaching the border 156. As described above, the quality of the wireless communication between the mobile phone 160 and the BTS 162 degrades at the edge of the CDMA cell 152. Although CDMA technology includes error correction to make up for some data lost in transmission, occasionally the quality of service degrades to the point that communication is impossible.

In some markets, the same carrier, for instance, AT&T or Ameritech will own both the CDMA systems and the AMPS systems for a given geographical area. Although most mobile phones originally produced for the AMPS system are not capable of communicating with a CDMA system, the reverse is not always true. Specifically, many mobile phones can communicate with both the CDMA and AMPS BTSs. These phones are known as dual-mode phones. CDMA systems operate in two frequency bands, the cellular band (800 MHz) and the PCS band (1900 MHz). AMPS systems also operate in the 800 MHz band. A PCS phone which also operates in the 800 MHz band, whether in cellular mode or AMPS mode, is known as a dual-band phone.

If the same carrier owns both an AMPS system and a CDMA system within the same geographical area, the carrier wants to provide the best service to the mobile phone 160 irrespective of which system (AMPS or CDMA) on which the phone is currently operating. For instance, when the mobile phone 160 is nearing the edge of a CDMA system, the system 100 can search for the best available system, regardless of type. This is a radical change from previous cell phone systems that required the mobile phone 160 to stay on one system regardless of quality because that was all that was available.

As depicted in FIG. 2, the mobile phone 160 is nearing the border 156. It is likely experiencing a poor connection either from the BTS 162 or as it is establishing a new connection with BTS 164. However, note that the AMPS BTS station 168, given its proximity to the mobile phone 160, is likely able to provide a good level of service. Unfortunately, conventional cell phones are designed to remain with one system as long as one is available. In this example, a cell phone of the prior art will stay with the CDMA system, communicating with the BTSs 162 and 164 regardless of how poor the signal becomes. As described below, embodiments of the present invention are able to measure factors indicative of poor cellular communication quality, and if the mobile phone 160 is experiencing poor quality, search for another cellular system as directed by the carrier.

Figure 3:
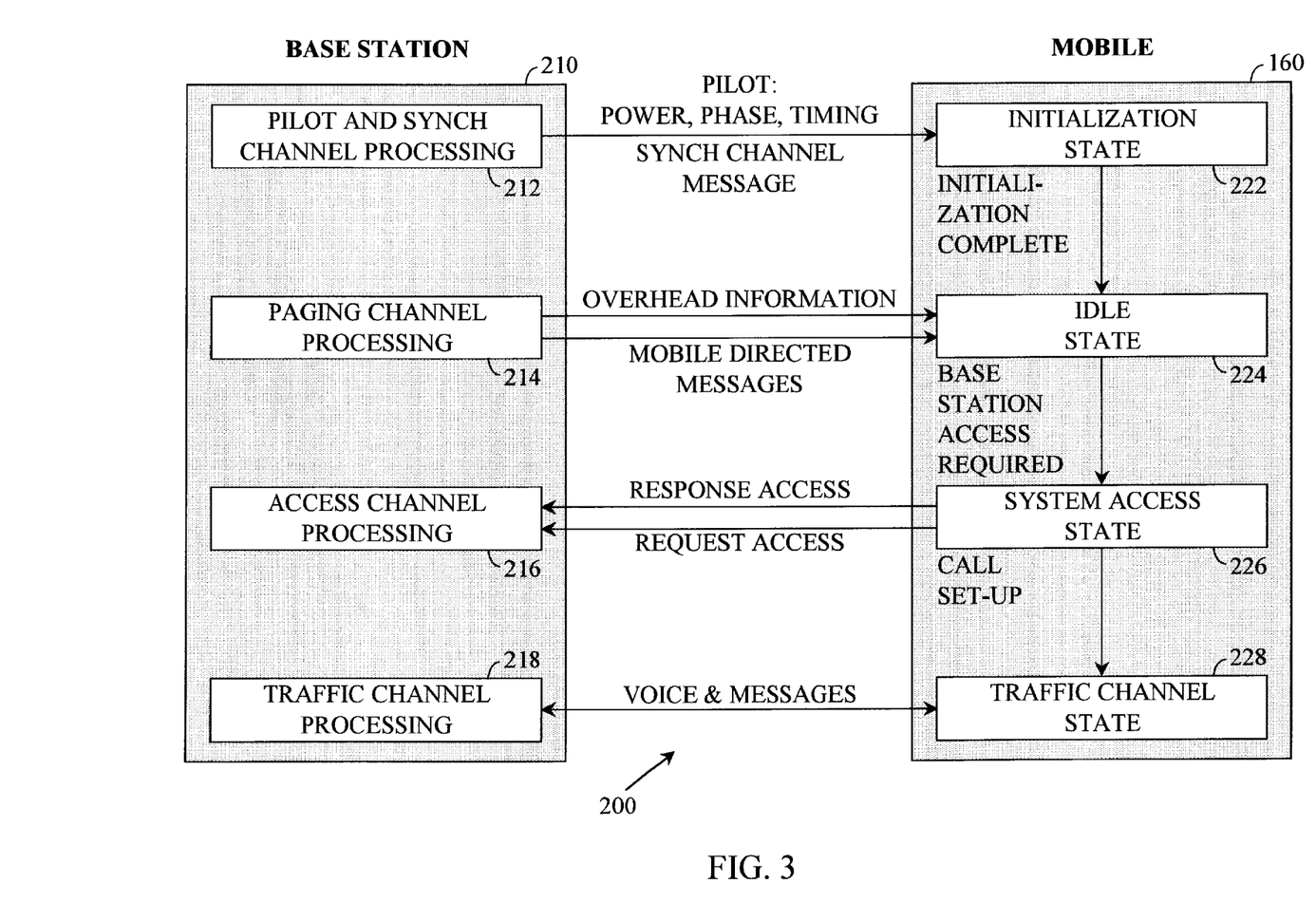
FIG. 3 is a flowchart indicating different states of a wireless communication device and a base station for a wireless communication device.

In FIG. 3, a state diagram 200 shows different operational states for a base station 210 and the mobile phone 160. These states are known in the art and will be discussed only briefly. In an initialization state 222, the mobile phone 160 receives a pilot signal and synchronization signals from the base station 210, which is in a pilot and sync channel processing state 212. Once the mobile phone 160 is initialized, it enters an idle state 224. While the mobile phone 160 is in the idle state 224, the base station 210 is in a paging channel processing state 214 and sends paging messages and overhead information to the mobile phone. That is, the mobile phone 160 monitors and processes Paging Channel messages and overhead information sent by the base station. The mobile phone 160 remains in the idle state 224 once it has powered up and initialized while it is waiting to place a call, or waiting for a call to be placed to it. When the mobile phone 160 makes or receives a call, it changes from the idle state 224 to a system access state 226. In the system access state 226, the mobile phone 160 requests a channel from the base station 210. The base station 210 responds to set up the channel in an access channel processing state 216. Once the traffic channel is set up between the base station 210 and the mobile phone 160, the mobile phone enters a traffic channel state 228, while the base station 210 enters a traffic channel processing state 218. While in these states, the mobile phone 160 is sending and receiving data, such as voice data to and from the base station 210.

Embodiments of the invention are directed to two main systems maintained in the mobile phone 160. In the first embodiment, described with reference to FIG. 4 and related text, the mobile phone 160 is just entering a service provider system. This can occur when the mobile phone 160 is first turned on, or is first attempting to communicate with a BTS. The mobile phone 160 first determines whether it is receiving sufficient total power to permit a satisfactory level of performance by the cell phone. If so, the mobile phone 160 enters the idle state 224 for further monitoring. If not enough total power is reaching the mobile phone 160, it exits the first service provider system to find a better service provider system. In the second embodiment, while in the idle state 224, the mobile phone 160 monitors the pilot strength (Ec/Io) and the pilot received power (RSSI) to determine if both are below their respective predetermined thresholds. If both of these levels remain below the respective thresholds too long, the mobile phone 160 searches for another service provider system. This second embodiment is described with respect to FIG. 5 and the related text.

Figure 4:
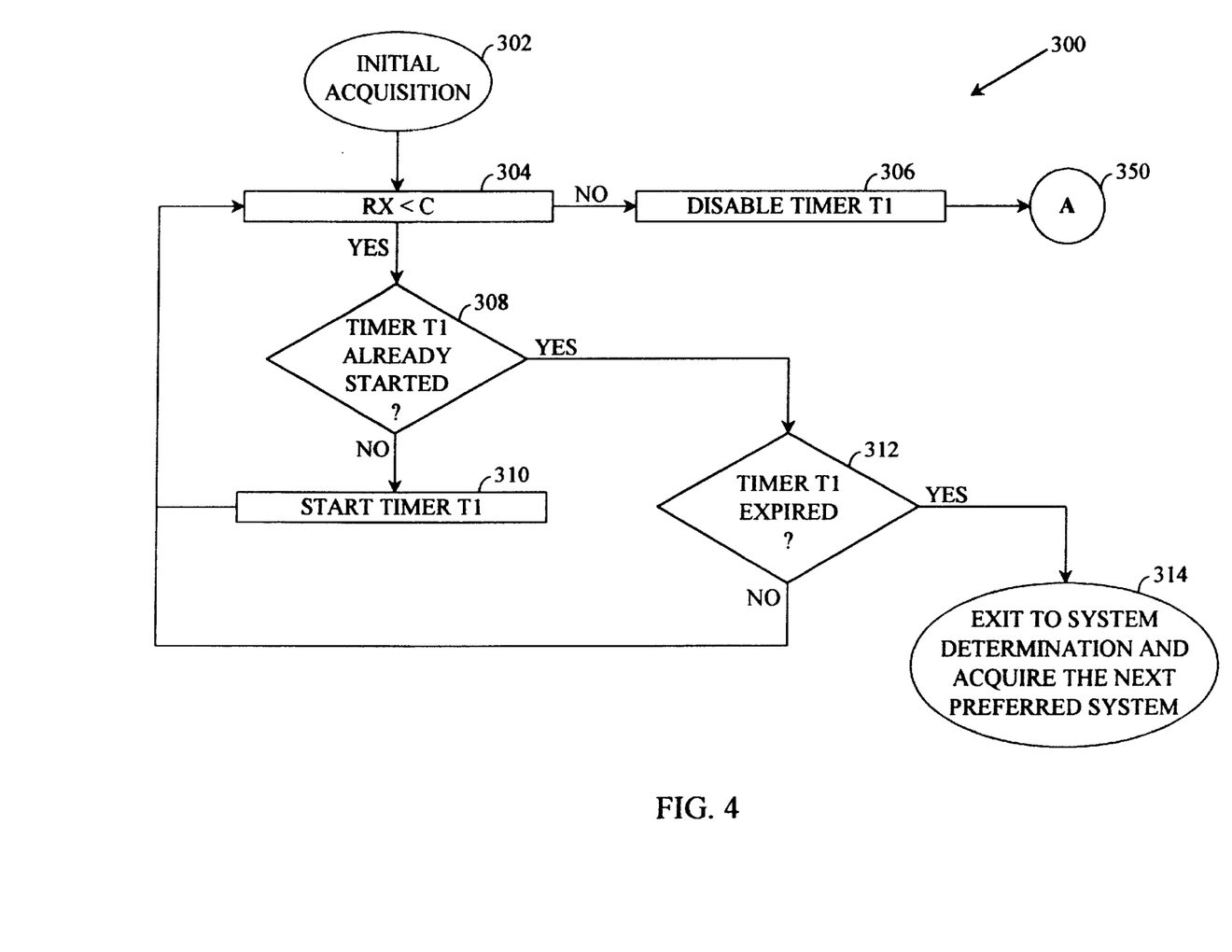
FIG. 4 is a flowchart showing the logical flow of an embodiment of the present invention.

A flowchart 300 of FIG. 4 is performed while the mobile phone 160 is in the initialization state 222 (see FIG. 3). The flowchart 300 begins with an initial acquisition 302. The mobile phone 160 will be in the initial acquisition 302 if the phone just acquired a CDMA service provider system, for instance, if the mobile phone 160 was just turned on, reset, or just changed from another service provider system. In the initial acquisition step 302, the mobile phone 160 is primarily interested in knowing how much total received power (Rx) is present. It determines this information using the total received power processor 124 (see FIG. 1).

After the mobile phone 160 has acquired a CDMA service provider system in the initial acquisition 302, the mobile phone compares the total received power Rx, to a threshold C in a comparison step 304. This comparison is performed by the total received power processor 124 of FIG. 1. In an exemplary embodiment, total received power is measured in dBm, and includes CDMA signals, noise, and interference.

CDMA signals are those signals sent from the base station 210 (see FIG. 3) directed to the particular mobile phone 160. Interference is the sum of signals being transmitted from any base station 210 or from any other mobile phones 160 that is received by the transceiver 112 (see FIG. 1) and quantified by the signal detector 116. Noise is any other signal detected at the transceiver 112 and can include environmental noise and/or disruptions in the electromagnetic spectrum.

In comparison 304 of FIG. 4, the total received power processor 124 determines whether or not the total received power Rx is less than the threshold C. The threshold C can be any appropriate value, and by way of example, is set at −105 dBm for CDMA PCS and −107 dBm for CDMA cellular systems. If the total received power processor 124 determines that Rx is greater than C, the output from comparison 304 is NO and the system 100 progresses to step 306 where a timer t1 is disabled. The timer t1 is located within the timers 118 of FIG. 1. In this particular instance, where the total received power in comparison 304 is initially greater than C, the timer t1 never starts. Regardless of whether the timer t1 was ever running, once the timer t1 is disabled in step 306, the system 100 progresses to an initial step 350 depicted in FIG. 5.

Returning to comparison 304, if the total received power Rx is less than C, the result of comparison 304 is YES and the system 100 enters a decision 308. In decision 308, a query is sent to the timers 118 of FIG. 1 to determine if the timer t1 had been previously started. If the timer t1 had not already been started, it is then immediately started in step 310, and the system 100 loops back to the comparison 304, where the total received power Rx is again checked against the threshold C.

If by this time the total received power Rx is above the threshold C, the system 100 exits comparison 304 with a NO response, as described above. However, if the total received power Rx remains below the threshold C in comparison 304, the system 100 again enters decision 308. Since the timer t1 is already running, the system 100 checks to see if the timer t1 has expired in decision 312. In an exemplary embodiment, the timer t1 will expire two seconds after it starts. If the timer t1 has not yet expired, the result of decision 312 is NO and the system 100 loops back to comparison 304 where the total received power Rx is again checked against the threshold C.

As an overview to the flowchart 300, once the mobile phone 160 enters the initial acquisition state 302, the total received power processor 124 evaluates the total received power Rx signal. If at any time within the time period of the timer t1 (e.g., two seconds), the total received power Rx climbs above the threshold C, the system 100 exits to step 350, shown in FIG. 5. If, however, the total received power Rx is below the threshold C, for more than two seconds, the system 100 exits to step 314, described below.

In step 314, the system 100 forces the mobile phone 160 to abandon the present service provider system to try to connect to a better one. This system determination is performed by the system determinator 128 of FIG. 1. This system determination can be performed in a number of ways. For instance, in an exemplary embodiment, a list of preferred service provider systems is kept in a preferred roaming list (not shown). The preferred roaming list is a list of frequencies and bands used in different parts of the country. A telephone manufacturer will originally program the system determinator 128 with a generic preferred roaming list, containing default frequencies within the frequency tables. When the mobile phone 160 is purchased by a customer, the carrier servicing the mobile phone 160 may reprogram the preferred roaming list for the benefit of the carrier. For example, the carrier could program the preferred roaming list to attempt to contact their own service provider systems first, and then contact all the service provider systems with whom they have contracts, and then try any available service provider system. Alternatively, the carrier may program the preferred roaming list to try all of the CDMA service provider systems prior to switching to any AMPS service provider system. Emergency calls made from the mobile phone 160 always go with the best service provider system available, regardless of carrier preference.

In one embodiment, the preferred roaming list (not shown) can contain up to 30 or 40 service provider systems. In another embodiment, the system determinator 128 of the system 100 can receive an updated preferred roaming list using data signals received from the base station 210. Unlike the programming option described above, this new preferred roaming data must be sent from the base station 210 each time the mobile phone 160 is initialized. In still another embodiment, the mobile phone 160 could use a most recently used (MRU) list to determine one of the most recently used service provider systems, as is known in the art.

Figure 5:
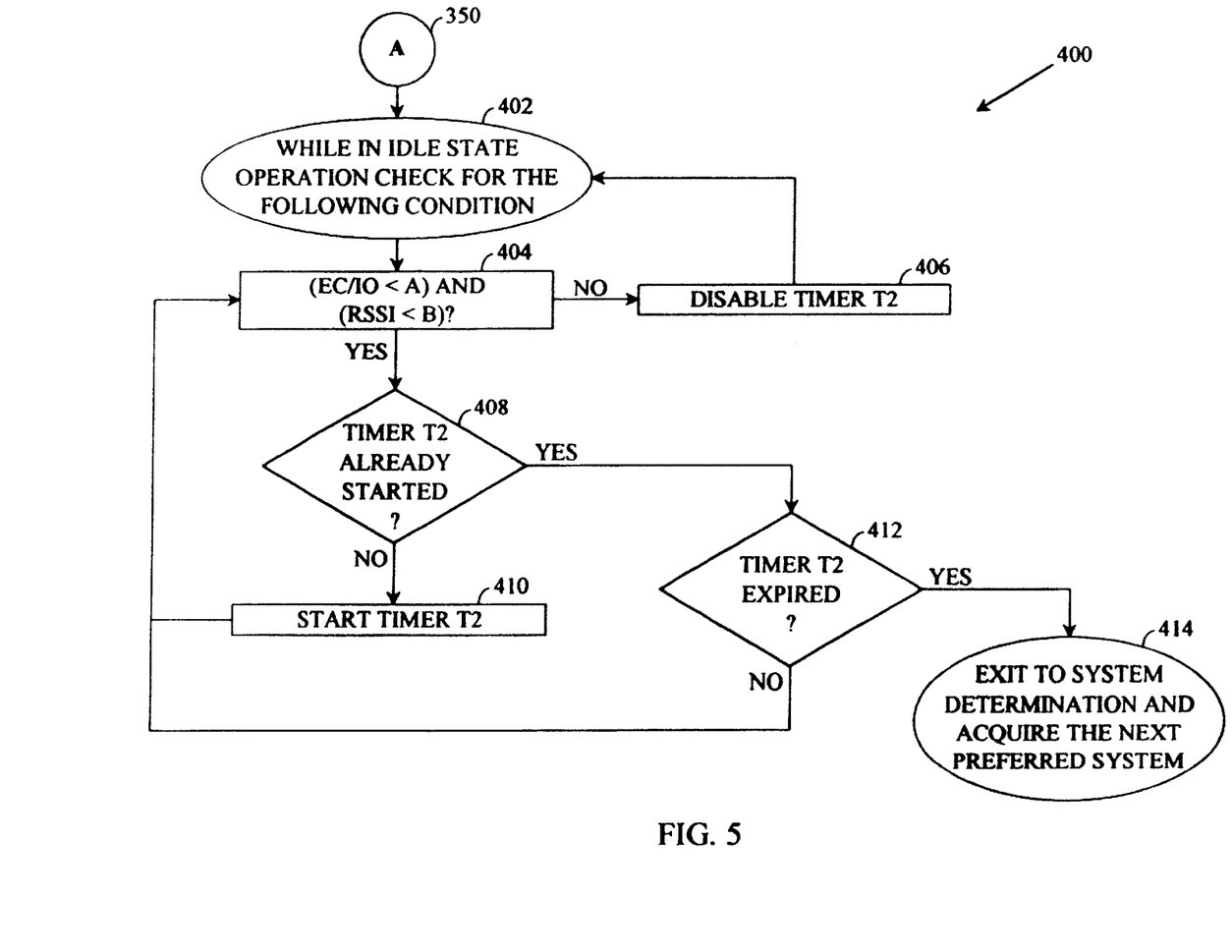
FIG. 5 is a flowchart indicating logical flow for another embodiment of the present invention.

FIG. 5 shows a flowchart 400 illustrating another embodiment of the present invention. The system 100 begins in step 350 after the mobile phone 160 has established that the total received power Rx is greater than the threshold C (see FIG. 4). From step 350, the mobile phone 160 enters the idle state 224, as depicted in and described with reference to FIG. 3. As is known in the art, while in the idle state 224, the base station 210 sends paging and other overhead messages to the mobile phone 160. Step 402 illustrates that the mobile phone 160 is in the idle state 224. In comparison 404, the mobile phone 160 monitors signal levels for one or more predetermined conditions. The first condition the mobile phone 160 determines in comparison 404 is whether the CDMA pilot strength (Ec/Io) is less than a threshold A. The second condition the mobile phone 160 checks for is whether the pilot received power (RSSI) is less than a second threshold B.

The mobile phone 160 monitors the strength of the pilot channel at all times while operating in a particular cell. The pilot strength processor 120 of FIG. 1 performs the calculation within comparison 404. As stated above, the pilot strength (Ec/Io) is dependent upon the number of cell phones 160 currently active within the given cell. That is, as the number of cell phones 160 active in the given cell increases, the pilot strength Ec/Io decreases.

The other condition measured in the step 404 is whether the pilot received power RSSI is less than the second threshold B. Recall that RSSI is independent of how many cell phones 160 are active in the given cell. Variation in the RSSI is indicative of path loss changes in the forward link from the base station 210 to the particular mobile phone 160.

Note that the condition considered in comparison 404 consists of two independent measurements coupled by an AND clause. If either of the conditions yields a positive result (i.e., if the pilot strength Ec/Io ever reaches or goes above the threshold A or if the RSSI ever reaches or goes above the threshold B), the result of comparison 404 is NO. In that event, in step 406, the timer t2, controlled by the timers 118 of FIG. 1, is disabled and reset. The system 100 then returns to state 402 and comparison 404 where the pilot strength (Ec/Io) and the RSSI are both measured again. If, however, both the pilot strength (Ec/Io) and the RSSI are below their respective thresholds, the result of comparison 404 is YES. In that event, the system 100 moves to decision 408.

In decision 408, the system 100 determines whether the timer t2 is running by communicating with the timers 118. If the timer t2 is not already running, the system 100 proceeds to step 410 and starts the timer t2 in the timers 118 of FIG. 1. The system 100 then returns to comparison 404 where the conditions are checked once again.

If the timer t2 has already started, the result of decision 408 is YES and, in decision 412 the system 100 determines whether or not the timer t2 has expired. If the timer t2 has not expired, the result of decision 412 is NO and the system 100 returns to comparison 404 where the conditions are once again checked. In an exemplary embodiment, the timer t2 is set to expire eight seconds after it starts.

Operation of the timer t2 is similar to the operation of the timer t1 (see FIG. 4). However, one major difference between timer t2 and timer t1 is that the mobile phone 160 that is in the idle state (i.e., running flowchart 400) occasionally goes to sleep. When asleep, the flowchart 400 maintains its current position (i.e., whatever step the flowchart 400 is performing when it enters the sleep state will be suspended and will resume once it wakes up). The same applies to the timer t2, in that the timer is suspended at times during which the mobile phone 160 is asleep. Stated another way, when the mobile phone 160 goes to sleep, so does the timer t2. When the mobile phone 160 wakes up, it will either proceed eventually back to comparison 404, or to step 414 as described below. If the system 100 returns to comparison 404, the pilot strength (Ec/Io) and RSSI are again evaluated to see whether they exceed the thresholds A and B, respectively. If both conditions of decision 404 are met for the duration of timer t2, the system 100 will exit decision 412 as YES and attempt to acquire a new service provider system. That is, if the pilot strength and the RSSI are both less than the thresholds A and B, respectively, for the entire time period of timer t2 (e.g., eight seconds), the system 100 will exit decision 412 as YES and attempt to acquire a more desirable service provider system in step 414.

The step 414 is an improvement over the step 314, as shown in and described with reference to FIG. 4. In step 414, the phone can get the exact list of systems available in the area from the overhead messages transmitted by some BTS 210. This BTS is the BTS which it is listening to during idle operation. This is better than counting on the roaming list, which can contain identifiers for a great many systems, and which therefore can take a long time before it finds the next preferred system.

It is to be understood that even though various embodiments and advantages of the present invention have been set forth in the foregoing description, the above disclosure is illustrative only, and changes may be made in detail, yet remain within the broad principles of the invention. For example, other quantitative measures, such as bit-error rate (BER), or the like can be used to determine the quality of the received signal. In addition, the time periods illustrated herein can be readily altered to accommodate different systems and different measurement criteria. For example, the system 100 can use one set of time periods when measuring signal quality in a digital system and a different set of time periods when measuring signal quality in an AMPS system. Therefore, the present invention is to be limited only by the appended claims.

What is claimed is:

1. In a wireless telephone communication system having more than one service provider system, a method to enhance performance of a mobile phone, comprising:

when the mobile phone that is communicating with a first service provider system is in an idle mode, monitoring a first performance level and a second performance level;

if the first performance level falls below a first threshold and the second performance level falls below a second threshold, starting a timer;

if, while the timer is running, either the first or second performance levels exceed their respective thresholds, resetting the timer and continue monitoring the first and second performance levels; and if the timer exceeds a predetermined duration, switching the mobile telephone from the first service provider system to a second service provider system.

2. The wireless communication system of claim 1 wherein the first performance level is pilot strength.

3. The method of claim 1 wherein the second performance level is a received signal strength indication.

4. The method of claim 1 wherein both the first and second service provider systems are CDMA digital service provider systems.

5. The method of claim 1 wherein the first service provider system is a CDMA digital service provider system and wherein the second service provider system is an AMPS cellular service provider system.

6. The method of claim 1 wherein the switching comprises:

retrieving a frequency from a list of alternate service provider systems;

disconnecting the mobile phone from the first service provider system; and connecting the mobile phone to the second service provider system operating at the frequency retrieved from the list of alternate service provider systems.

7. The method of claim 6 wherein the list of alternate service provider systems is stored within the mobile phone.

8. A wireless telephone comprising:

a signal detector structured to receive and measure a first performance level of communication signals after the telephone has connected to a first service provider system;

a signal comparator structured to compare the first performance level with a first threshold level;

a timer that begins when the first performance level is below the first threshold level and expires a preselected time period after it begins;

a system determinator structured to determine a second service provider system for the wireless telephone to connect to when the timer expires;

a second signal detector structured to receive and measure a second performance level of communication signals; and a second signal comparator structured to compare the second performance level with a second threshold level;

wherein the timer begins when both the first performance level is below the first threshold level and when the second performance level is below the second threshold level.

9. The wireless telephone of claim 8 wherein the signal detector detects total power received by the wireless telephone.

10. The wireless telephone of claim 8 wherein the first service provider system is a CDMA digital service provider system and the first threshold level used by the signal comparator is −107 dBm for cellular and −105 dBm for PCS.

11. The wireless telephone of claim 8 wherein the timer expires 2 seconds after it begins.

12. The wireless telephone of claim 8, further comprising a preferred roaming list containing operational frequencies of a plurality of possible service provider systems, the system determinator selecting an operational frequency of the second service provider system from the preferred roaming list and disconnecting the wireless telephone from the first service provider system and connecting the wireless telephone to the second service provider system operating at the frequency selected from the preferred roaming list.

13. The wireless telephone of claim 12 wherein the wireless preferred roaming list is stored within the wireless telephone.

14. The wireless telephone of claim 8 wherein the wireless telephone is a dual-mode or dual-band telephone.

15. The wireless telephone of claim 8 wherein the signal detector measures pilot strength.

16. The wireless telephone of claim 8 wherein the second signal detector measures pilot received power.

* * * * *